(12) United States Patent
Yamaguchi

(10) Patent No.: US 10,060,645 B2
(45) Date of Patent: Aug. 28, 2018

(54) INDOOR UNIT OF AIR-CONDITIONING APPARATUS AND AIR-CONDITIONING APPARATUS INCLUDING THE INDOOR UNIT

(71) Applicant: Mitsubishi Electric Corporation, Tokyo (JP)

(72) Inventor: Kouji Yamaguchi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/315,087

(22) PCT Filed: Jun. 17, 2015

(86) PCT No.: PCT/JP2015/067485
§ 371 (c)(1),
(2) Date: Nov. 30, 2016

(87) PCT Pub. No.: WO2015/194596
PCT Pub. Date: Dec. 23, 2015

(65) Prior Publication Data
US 2017/0198936 A1 Jul. 13, 2017

(30) Foreign Application Priority Data
Jun. 19, 2014 (JP) .................................. 2014-126426

(51) Int. Cl.
*F28F 9/00* (2006.01)
*F24F 11/30* (2018.01)
(Continued)

(52) U.S. Cl.
CPC ............ *F24F 11/30* (2018.01); *F24F 1/0007* (2013.01); *F24F 11/0079* (2013.01);
(Continued)

(58) Field of Classification Search
CPC ............ F24F 11/0017; F24F 2011/0045; F24F 11/0086; F24F 1/0007; F24F 11/0079;
(Continued)

(56) References Cited

U.S. PATENT DOCUMENTS 5,769,707 A 6/1998 Jang et al.
5,983,657 A * 11/1999 Murata ................ B60H 1/3225
62/129

(Continued)

FOREIGN PATENT DOCUMENTS

JP H10-110971 A 4/1998
JP H11-153372 A 6/1999
(Continued)

OTHER PUBLICATIONS

International Search Report of the International Searching Authority dated Aug. 25, 2015 for the corresponding international application No. PCT/JP2015/067485 (and English translation).
(Continued)

*Primary Examiner* — Davis Hwu
(74) *Attorney, Agent, or Firm* — Posz Law Group, PLC

(57) ABSTRACT

An indoor unit of an air-conditioning apparatus includes a casing including an air inlet, an air outlet, and an air passage communicating between the air inlet and the air outlet, the air inlet being located lower than the air outlet, an indoor heat exchanger disposed inside the casing, an indoor fan disposed inside the casing and configured to supply air to the indoor heat exchanger, a refrigerant leakage sensor disposed in the air passage between the air inlet and the air outlet at a position lower than the indoor heat exchanger and the air outlet, and configured to detect refrigerant leakage, and a controller configured to determine whether refrigerant leakage occurs according to a detection result of the refrigerant leakage sensor.

12 Claims, 13 Drawing Sheets

(51) Int. Cl.
*F24F 11/00* (2018.01)
*F24F 1/00* (2011.01)
*F24F 11/77* (2018.01)
*F24F 11/36* (2018.01)
*F24F 11/52* (2018.01)

(52) U.S. Cl.
CPC .......... *F24F 11/0086* (2013.01); *F24F 11/77* (2018.01); *F24F 11/36* (2018.01); *F24F 11/52* (2018.01); *F24F 2001/004* (2013.01); *F24F 2011/0084* (2013.01); *F24F 2011/0091* (2013.01)

(58) Field of Classification Search
CPC ......... F24F 2001/004; F24F 2011/0084; F24F 2011/0091
USPC .......................................................... 165/67
See application file for complete search history.

(56) References Cited

U.S. PATENT DOCUMENTS

2005/0109053 A1* 5/2005 Eom .................... F24F 1/0007 62/285
2015/0211782 A1 7/2015 Ikeda et al.

FOREIGN PATENT DOCUMENTS

| JP | H11-159924 A | 6/1999 |
|---|---|---|
| JP | H11-173713 A | 7/1999 |
| JP | 2001-208392 A | 8/2001 |
| JP | 2002-098346 A | 4/2002 |
| JP | 2002-098391 A | 4/2002 |
| JP | 2002-098393 A | 4/2002 |
| JP | 2003-130383 A | 5/2003 |
| JP | 2003-130385 A | 5/2003 |
| JP | 2006-275310 A | 10/2006 |
| JP | 2011-106697 A | 6/2011 |
| JP | 2012-013348 A | 1/2012 |
| JP | 2014-005952 A | 1/2014 |
| JP | 2014-035171 A | 2/2014 |
| WO | 2013/038703 A1 | 3/2013 |
| WO | 2013/038704 A1 | 3/2013 |
| WO | 2013150568 A1 | 10/2013 |

OTHER PUBLICATIONS

Office Action dated Sep. 6, 2017 in corresponding NZ application No. 727898.
Office action dated Oct. 10, 2017 in corresponding JP patent application No. 2016-529409 (and English machine translation attached).
Office Action dated Oct. 6, 2017 issued in corresponding AU patent application No. 2015277826.
Extended European Search Report dated May 23, 2017 issued in corresponding EP patent application No. 15810109.7.
Office Action dated Jan. 8, 2018 issued in corresponding NZ patent application No. 727898.
Communication pursuant to Article 94(3) EPC dated Mar. 6, 2018 issued in corresponding EP patent application No. 15810109.7.
Office Action dated Apr. 19, 2018 issued in corresponding NZ patent application No. 727898.

* cited by examiner

INDOOR UNIT OF AIR-CONDITIONING APPARATUS AND AIR-CONDITIONING APPARATUS INCLUDING THE INDOOR UNIT

CROSS REFERENCE TO RELATED APPLICATIONS

This application is a U.S. national stage application of PCT/JP2015/067485 filed on Jun. 17, 2015, which claims priority to Japanese Patent Application No. 2014-126426 filed on Jun. 19, 2014, the contents of which are incorporated herein by reference.

TECHNICAL FIELD

The present invention relates to an indoor unit of an air-conditioning apparatus including a refrigerant leakage detector, and to an air-conditioning apparatus including such an indoor unit.

BACKGROUND

In air-conditioning apparatuses, R410A which is a HFC refrigerant has thus far been mainly employed as refrigerant to circulate in a refrigerant circuit. Although R410A has zero ozone layer depletion potential (ODP) and hence makes no harm to the ozone layer unlike conventional HCFC refrigerants such as R22, R410A has high global warming potential (GWP). Accordingly, the HFC refrigerant having high GWP such as R410A is being gradually replaced with other HFC refrigerants having low GWP, from the viewpoint of global warming prevention.

Examples of the HFC refrigerants having low GWP include halogenated hydrocarbon containing a carbon double bond in the composition, typically exemplified by HFO-1234yf ($CF_3CF=CH_2$; tetrafluoropropane), HFO-1234ze ($CF_3-CH=CHF$), and HFO-1123 ($CF_2=CHF$). Although those refrigerants belong to the group of HFC refrigerants, these refrigerants are often called HFO, where O represents olefin, because unsaturated hydrocarbon containing a carbon double bond is called olefin. Therefore, the refrigerants described above will be denoted as HFO refrigerants, for distinction from the HFC refrigerants that do not contain a carbon double bond in the composition, such as R32 ($CH_2F_2$; difluoromethane) and R125 ($CHF_2-CF_3$; pentafluoroethane) contained in R410A.

Although the HFO refrigerant having low GWP may be employed in the form of a single refrigerant, the HFO refrigerant may also be employed in the form of a mixed refrigerant containing a plurality of types of other refrigerants including a HFC refrigerant such as R32. Although the HFO refrigerant, or a mixed refrigerant containing the HFO refrigerant and the HFC refrigerant is not as highly flammable as a HC refrigerant such as R290 ($C_3H_8$; propane), such refrigerant is slightly flammable unlike R410A which is non-flammable. Accordingly, refrigerant leakage has to be taken care of. The refrigerants that have flammability, from low flammable ones to highly flammable ones, will hereinafter be called flammable refrigerants. R32 exhibits low flammability like HFO refrigerants, when used in the form of a single refrigerant. Therefore R32 is a flammable refrigerant, and consequently the mixed refrigerant containing the HFO refrigerant and R32 is also regarded as a flammable refrigerant. However, R410A which is a mixture of R32 and R125 is non-flammable owing to the characteristic of R125.

In case that such flammable refrigerant leaks out into room air and resides in the room without diffusing, a gas phase of flammable concentration may be generated in the room, and therefore in case that an ignition source is present in the gas phase of flammable concentration, the refrigerant may catch fire. As first step for avoiding combustion of the refrigerant which has leaked out into the room, the refrigerant leakage has to be detected by the air-conditioning apparatus.

PATENT LITERATURE

Patent Literature 1: Japanese Unexamined Patent Application Publication No. 2002-98393 (see, for example, page 5, and FIG. 1 and FIG. 2)

In some indoor units (floor-mounted indoor units), an air inlet and an air outlet are positioned opposite to those of the indoor unit of the air-conditioning apparatus according to Patent Literature 1, in an up and down direction. More specifically, some indoor units include an indoor unit casing in which the air inlet is located lower than the air outlet.

Now, with a location of a gas sensor as described in Patent Literature 1, the refrigerant leakage may be unable to be detected when the refrigerant leaks out between the air inlet and a heat exchanger or the air outlet.

In addition, with the location of the gas sensor as described in Patent Literature 1, it takes a long time before the gas sensor located on an outer surface of the casing detects the refrigerant leakage, when the refrigerant which has leaked out between the air inlet and the air outlet is discharged through the air outlet into the room space. Further, a highly sensitive gas sensor has to be employed since the refrigerant which has leaked out and diffused in the room space has to be detected.

SUMMARY

The present invention has been accomplished in view of the foregoing problem, and provides an indoor unit of an air-conditioning apparatus capable of more reliably detecting refrigerant leakage while an indoor fan is out of operation, and an air-conditioning apparatus including such an indoor unit.

In one embodiment, the present invention provides an indoor unit of an air-conditioning apparatus. The indoor unit includes a casing including an air inlet, an air outlet, and an air passage communicating between the air inlet and the air outlet, the air inlet being located lower than the air outlet, an indoor heat exchanger disposed inside the casing, an indoor fan disposed inside the casing and configured to supply air to the indoor heat exchanger, a refrigerant leakage sensor disposed in the air passage between the air inlet and the air outlet at a position lower than the indoor heat exchanger and the air outlet, and configured to detect refrigerant leakage, and a controller configured to determine whether refrigerant leakage occurs according to a detection result of the refrigerant leakage sensor.

The indoor unit of the air-conditioning apparatus according to one embodiment of the present invention includes the casing in which the air inlet is located lower than the air outlet, and the first refrigerant sensor is located lower than the indoor heat exchanger inside the casing. The mentioned configuration enables the refrigerant leakage to be more reliably detected while the indoor fan is out of operation.

DETAILED DESCRIPTION

Figure 1:
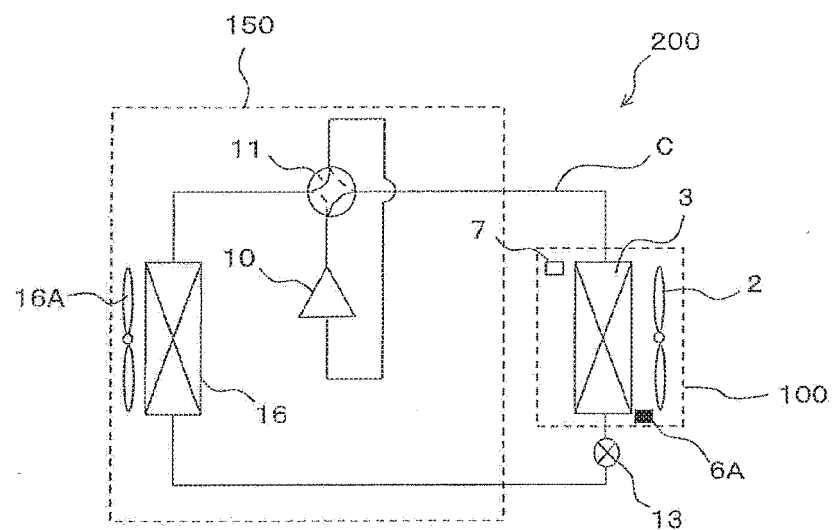
FIG. 1 is a diagram for illustrating a refrigerant circuit configuration of an air-conditioning apparatus 200 according to Embodiment 1 of the present invention.

Hereafter, Embodiments of an indoor unit of an air-conditioning apparatus according to the present invention will be described with reference to the drawings. Embodiments described hereunder are not intended to limit the present invention. In FIG. 1 and other drawings, dimensional relations among the elements illustrated in the drawings may differ from actual ones.

Embodiment 1

FIG. 1 is a diagram for illustrating a refrigerant circuit configuration of the air-conditioning apparatus 200 according to Embodiment 1 of the present invention. Referring to FIG. 1, a configuration or the like of the air-conditioning apparatus 200 will be described.

The indoor unit 100 of the air-conditioning apparatus 200 according to Embodiment 1 includes a modification that enables more reliable detection of refrigerant leakage while an indoor fan 2 is in operation and out of operation.

[Explanation of Configuration]

The air-conditioning apparatus 200 includes, as shown in FIG. 1, the indoor unit 100 to be installed in an air-conditioned space (indoor, a room in a building, or a warehouse), and an outdoor unit 150 to be installed outside the air-conditioned space. The air-conditioning apparatus 200 includes a refrigerant circuit C including the indoor unit 100, the outdoor unit 150, and a refrigerant pipe connecting therebetween.

The air-conditioning apparatus 200 also includes a compressor 10 that compresses refrigerant, a flow switching valve 11 for switching between, for example, a cooling operation and a heating operation, an outdoor heat exchanger 16 that serves as a condenser (radiator) in the cooling operation and as an evaporator in the heating operation, an expansion device 13 that depressurizes the refrigerant, and an indoor heat exchanger 3 that serves as an evaporator in the cooling operation and as a condenser in the heating operation. The outdoor heat exchanger 16 is provided with an outdoor fan 16A that expedites the heat exchange between air and the refrigerant.

Here, the refrigerant employed in the air-conditioning apparatus 200 will be described.

A flammable refrigerant is charged in the refrigerant circuit C. Examples of the flammable refrigerant that may be employed include an HFO1234yf-based single refrigerant, a mixed refrigerant containing a tetrafluoropropene-based refrigerant, and a flammable refrigerant such as a hydrocarbon-based refrigerant.

Figure 2:
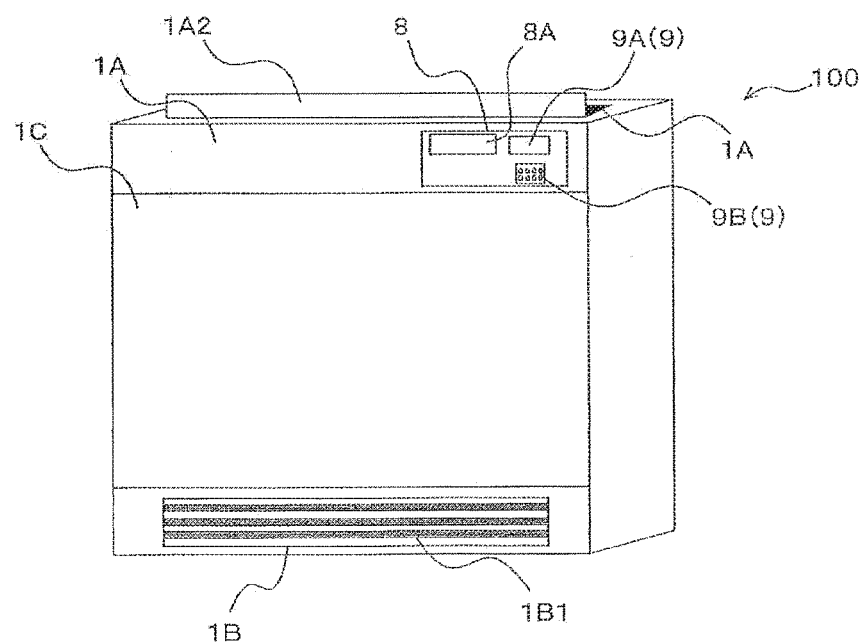
FIG. 2 is a schematic diagram for illustrating an indoor unit 100 of the air-conditioning apparatus 200 according to Embodiment 1 of the present invention.
Figure 3:
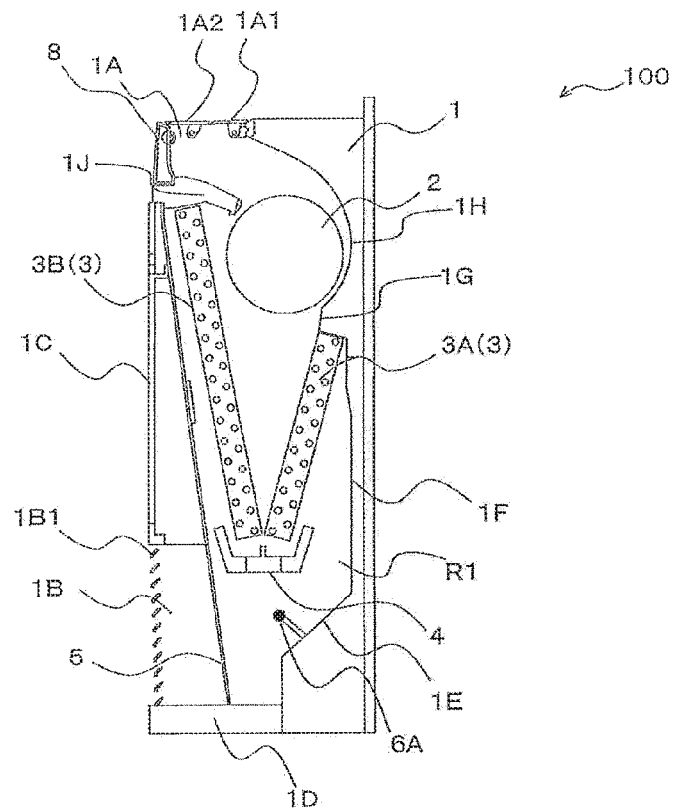
FIG. 3 is a side cross-sectional view for illustrating an external structure and internal structure of the indoor unit 100 shown in FIG. 2.
Figure 4:
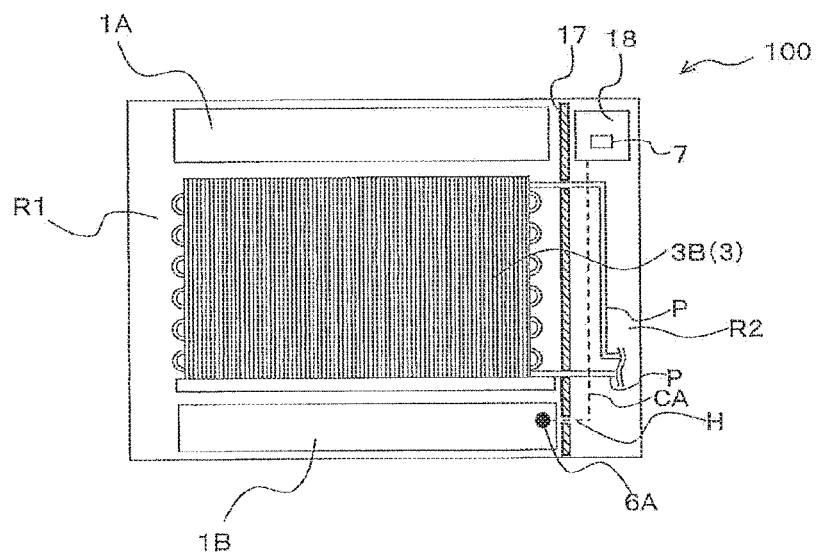
FIG. 4 is a schematic diagram for illustrating a mounting position of a refrigerant leakage sensor 6A in the indoor unit 100.
Figure 5:
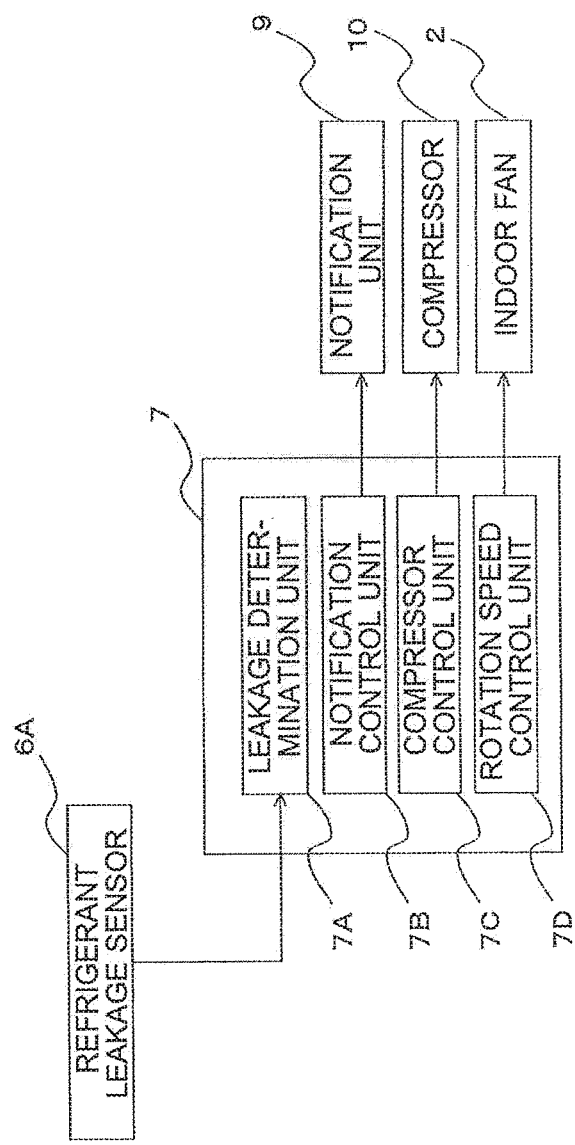
FIG. 5 is a block diagram for explaining a configuration of a controller 7 and associated components in the indoor unit 100 of the air-conditioning apparatus 200 according to Embodiment 1 of the present invention.

FIG. 2 is a schematic diagram for illustrating the indoor unit 100 of the air-conditioning apparatus 200 according to Embodiment 1. FIG. 3 is a side cross-sectional view for illustrating an external structure and internal structure of the indoor unit 100 shown in FIG. 2. FIG. 4 is a schematic diagram for illustrating a mounting position of a refrigerant leakage sensor 6A in the indoor unit 100. FIG. 5 is a block diagram for explaining a configuration of a controller 7 and associated components in the indoor unit 100 of the air-conditioning apparatus 200 according to Embodiment 1. Referring to FIG. 2 to FIG. 5, a configuration of the indoor unit 100 will be described.

The indoor unit 100 includes, as shown in FIG. 2, a casing 1 constituting an outer shell, an indoor fan 2 disposed inside the casing 1, an indoor heat exchanger 3 including a first heat exchanger 3A and a second heat exchanger 3B, a drain pan 4 for collecting dews stuck to the indoor heat exchanger 3, and a filter 5 for capturing dust or the like.

The indoor unit 100 also includes a refrigerant leakage sensor 6A for detecting the refrigerant leaking out in the casing 1, an electric parts box 18 containing the controller 7 that controls various components, a display panel 8 for displaying various information, such as an indication that the indoor unit 100 is in operation, and a partition plate 17 dividing between an air passage R1 and a space R2 in the casing 1. The space R2 is utilized for placing the electric parts box 18 and other components.

(Casing 1)

The casing 1 has an outer shell of, for example, a rectangular parallelepiped shape, and the air passage R1 formed to allow air flow. The casing 1 includes an air outlet 1A for discharging air therethrough and an air inlet 1B for introducing air therethrough. In the casing 1, the air inlet 1B, the filter 5, the indoor heat exchanger 3, the indoor fan 2, and the air outlet 1A are located in this order from an upstream side in the airflow direction. The air inlet 1B is provided with a grille 1B1 horizontally extending in parallel. The grille 1B1 serves to prevent, for example, a person's hand or finger from being inserted in the air inlet 1B. The air outlet 1A includes a louver 1A1 and a louver 1A2 which are pivotably disposed. With the louver 1A1 and the louver 1A2, the direction of air discharged by operation of the indoor fan 2 can be adjusted. In addition, when the indoor unit 100 is out of operation the air outlet 1A can be closed with the louver 1A1 and the louver 1A2, to prevent intrusion of dust or the like into the air passage in the casing 1.

The casing 1 includes a front panel 1C constituting a part of the front face of the indoor unit 100, a bottom face 1D against which the lower end portion of the filter 5 is abutted, a sloped portion 1E including a sloped surface, an upright portion 1F continuously extending upward from the sloped portion 1E, a support portion 1G and a support portion 1J each supporting an upper end portion of the indoor heat exchanger 3, and a curved portion 1H including a curved surface.

The surface (front face) of the front panel 1C represents the design of the indoor unit 100, and the back surface (rear face) of the front panel 1C is opposed to the filter 5. The air inlet 1B is located on the lower side of the lower end portion of the front panel 1C, and the display panel 8 is located on the upper side of the upper end portion of the front panel 1C. The lower face of the bottom face 1D is in contact with the floor of the air-conditioned space, and the upper face of the bottom face 1D is in contact with the lower end portion of the filter 5. The grille 1B1 formed in the air inlet 1B is located on the upper face of the front end portion of the bottom face 1D. The rear end portion of the bottom face 1D is abutted against the sloped portion 1E.

The sloped portion 1E includes a sloped surface inclined upward from the front side toward the rear side. The refrigerant leakage sensor 6A is mounted on the sloped surface of the sloped portion 1E. The front end of the sloped portion 1E is connected to the bottom face 1D, and the upper end of the sloped surface of the sloped portion 1E is connected to the upright portion 1F. The sloped portion 1E is formed so as to allow the air introduced into the casing 1 through the air inlet 1B to smoothly flow toward the indoor heat exchanger 3 along the sloped surface. The upright portion 1F is located on the rear side with respect to the indoor heat exchanger 3 (first heat exchanger 3A) and the drain pan 4, and extends toward the support portion 1G from the upper end of the sloped portion 1E.

The support portion 1G, the support portion 1J, and the curved portion 1H are located around the indoor fan 2. The support portion 1G is disposed on the upper end of the upright portion 1F, to support the upper end portion of the first heat exchanger 3A. The support portion 1J is disposed at the height position of the upper end of the front panel 1C, to support the upper end portion of the second heat exchanger 3B. The curved portion 1H is formed in a predetermined curved shape, to allow the air supplied from the indoor fan 2 to be smoothly discharged outward from the casing 1.

(Indoor Fan 2)

The indoor fan 2 includes, for example, a cross flow fan and a motor that drives the cross flow fan, and serves to introduce air into the casing 1 and discharge the air out of the casing 1. The indoor fan 2 is located downstream of the indoor heat exchanger 3. In addition, the indoor fan 2 is disposed at an upper position of the indoor heat exchanger 3.

(Indoor Heat Exchanger 3)

The indoor heat exchanger 3 includes a first heat exchanger 3A and a second heat exchanger 3B. The first heat exchanger 3A and the second heat exchanger 3B are disposed inside the casing 1 so as to form a V shape. To be more detailed, the first heat exchanger 3A and the second heat exchanger 3B are installed in the casing 1 such that the respective lower end portions of the first heat exchanger 3A and the second heat exchanger 3B are located close to each other and the respective upper end portions of the first heat exchanger 3A and the second heat exchanger 3B are spaced from each other. The lower end portions of the first heat exchanger 3A and the second heat exchanger 3B are located above the drain pan 4. The upper end portion of the first heat exchanger 3A is supported by the support portion 1G, and the upper end portion of the second heat exchanger 3B is supported by the support portion 1J.

The indoor heat exchanger 3 may be constituted of, for example, a fin-and-tube heat exchanger. The indoor heat exchanger 3 is connected to the outdoor heat exchanger 16 disposed in the outdoor unit 150, via a refrigerant pipe P. The refrigerant pipe P is routed from the side of the air passage R1 to the side of the space R2.

(Drain Pan 4)

The drain pan 4 collects dews stuck to the indoor heat exchanger 3. The refrigerant leakage sensor 6A mounted on the sloped portion 1E is located below the drain pan 4, and the indoor heat exchanger 3 is located above the drain pan 4. In addition, the filter 5 is located on the front side of the drain pan 4.

(Filter 5)

The filter 5 serves to capture dust or the like in the air introduced into the casing 1 through the air inlet 1B. The filter 5 is obliquely installed such that the lower end portion recedes backward from the front side of the casing 1.

(Refrigerant Leakage Sensor 6A)

The refrigerant leakage sensor 6A serves to detect the presence of the refrigerant residing in the lower region in the casing 1, when the refrigerant leaks out in the casing 1. The refrigerant leakage sensor 6A is disposed on the way of the air passage R1. The refrigerant leakage sensor 6A is mounted on the sloped portion 1E located below the indoor heat exchanger 3. Generally the flammable refrigerant is heavier than air, and therefore when the refrigerant leaks out, for example owing to damage in a portion located inside the casing 1 of the refrigerant pipe connected to the indoor heat exchanger 3, the refrigerant flows to the region below the indoor heat exchanger 3. Accordingly, the refrigerant leakage sensor 6A can detect the refrigerant which has moved to the region below the indoor heat exchanger 3. The refrigerant leakage sensor 6A may be based on, for example, oxygen concentration detection or flammable gas detection.

The refrigerant leakage sensor 6A is connected to the controller 7 via a wiring CA, so that the detection result of the refrigerant leakage sensor 6A is outputted to the controller 7. The refrigerant leakage sensor 6A is disposed close to the partition plate 17. In other words, the refrigerant leakage sensor 6A is disposed on near the right-hand end of the air passage R1, in a front view of the casing 1. Such a configuration decreases the length of a portion of the wiring CA located inside the air passage R1, thereby suppressing an increase in pressure loss originating from collision of air flowing in the air passage R1 with the wiring CA. The mentioned configuration also facilitates the connection between the refrigerant leakage sensor 6A and the controller 7, which also facilitates, for example, maintenance work. Further, since the length of the wiring CA can be reduced, the wiring CA can be prevented from being tangled up.

(Electric Parts Box 18)

The electric parts box 18 is disposed in the space R2 defined by the partition plate 17 and the casing 1. The electric parts box 18 contains the controller 7 that executes various control operations and other electric components. The controller 7 determines whether refrigerant leakage occurs, according to the detection result of the refrigerant leakage sensor 6A. The controller 7 then controls a notification unit 9, the compressor 10, and other components to be subsequently described, on the basis of the determination result.

The controller 7 includes a leakage determination unit 7A to which the detection result of the refrigerant leakage sensor 6A is outputted, a notification control unit 7B that causes the notification unit 9 to output a notification, a compressor control unit 7C that stops the compressor 10, and a rotation speed control unit 7D that increases the rotation speed of the indoor fan 2.

The leakage determination unit 7A determines whether refrigerant leakage occurs on the basis of an output (for example, voltage) from the refrigerant leakage sensor 6A. The leakage determination unit 7A determines that the refrigerant leakage occurs when the refrigerant leakage sensor 6A detects the presence of the refrigerant. The leakage determination unit 7A determines that the refrigerant leakage has occurred, for example, when the output from the refrigerant leakage sensor 6A varies so as to reach a first predetermined range. Here, the refrigerant leakage sensor 6A is intended to detect the refrigerant residing in the lower region in the casing 1 while the indoor fan 2 is out of operation.

The notification control unit 7B causes the notification unit 9 to output a notification when the leakage determination unit 7A determines that the refrigerant leakage occurs. The user can be notified that the refrigerant leakage has occurred when the notification unit 9 outputs the notification. In the case where the air-conditioning apparatus 200 is, for example, a multi-air-conditioning apparatus for building, the output from the notification control unit 7B may be transmitted to a central control room or a similar section.

The compressor control unit 7C stops the compressor 10 when the leakage determination unit 7A determines that the refrigerant leakage occurs. In case that the compressor 10 continues to operate when the refrigerant leaks out, for example owing to a damage in the indoor heat exchanger 3, the amount of refrigerant leakage is increased. Therefore, the compressor 10 is stopped to suppress the amount of refrigerant leakage, when it is determined that refrigerant leakage occurs.

The rotation speed control unit 7D increases the rotation speed of the indoor fan 2, when it is determined that refrigerant leakage occurs while the indoor unit 100 (indoor fan 2) is in operation. Here, the rotation speed control unit 7D may control the indoor fan 2 so as to increase the rotation speed from the rotation speed in the current operation, or to set the rotation speed to a predetermined rotation speed (e.g., maximum rotation speed).

In addition, the rotation speed control unit 7D activates the indoor fan 2, when it is determined that refrigerant leakage occurs while the indoor unit 100 (indoor fan 2) is out of operation. In this case, the rotation speed control unit 7D may control the indoor fan 2 to rotate, for example, at a maximum rotation speed.

The rotation speed control unit 7D can diffuse the refrigerant which has leaked out in the casing 1 to the air-conditioned space by performing above described control. Such a configuration prevents a break out of fire due to a spark originating from short circuit of an electric part, which may occur owing to an increase in refrigerant concentration inside the casing 1.

(Display Panel 8)

The display panel 8 is located, for example, in an upper portion of the casing 1. The display panel 8 includes a display screen 8A for displaying information such as the cooling operation, the heating operation, and a target temperature. The display panel 8 also includes the notification unit 9.

The notification unit 9 includes a lamp 9A and a speaker 9B. The lamp 9A is lit up in red, or blinks in red upon receipt of notification of refrigerant leakage from the notification control unit 7B, thereby notifying the user that the refrigerant leakage has occurred. The speaker 9B outputs, upon receipt of a notification of refrigerant leakage from the notification control unit 7B, an audible message to this effect. The position of the notification unit 9 is not limited to the above. For example, the notification unit 9 may be disposed at a position on the front panel 10.

(Partition Plate 17)

The partition plate 17 is a plate-shaped member that divides the space in the casing 1 into a left-hand space (air passage R1) and a right-hand space (space R2), in a front view of the casing 1. To be more detailed, the partition plate 17 serves as a partition between the air passage R1 in which the indoor fan 2 and the indoor heat exchanger 3 are located and through which the air introduced through the air inlet 1B and blown out through the air outlet 1A flows, and the space R2 in which the electric parts box 18 and the refrigerant pipe P are located. The refrigerant pipe P located in the space R2 is connected to the refrigerant pipe drawn from the side of the outdoor unit 150. In other words, the space R2 includes the pipe joint section, where the pipes are connected to each other.

The presence of the partition plate 17 prevents an increase in pressure loss which caused by the air introduced into the casing 1 through the air inlet 1B flowing into the space where the electric parts box 18 and other components are located. The partition plate 17 includes an opening H for passing therethrough the wiring CA connecting between the refrigerant leakage sensor 6A and the controller 7. The partition plate 17 also includes openings for passing therethrough the refrigerant pipe P.

[Explanation of Operation]

First, the case where the refrigerant has leaked out of the indoor heat exchanger 3 while the indoor unit 100 (indoor fan 2) is out of operation will be described. When a single refrigerant HFO1234-yf is employed for example, the density of this refrigerant is approximately 1.1 [g/cm$^3$], which is heavier than air. In addition, there is no circulation of the indoor air caused by the indoor fan 2. Accordingly, the refrigerant which has leaked out flows downward to the region below the indoor heat exchanger 3 in the casing 1. Therefore, the refrigerant leakage is detected mainly by the refrigerant leakage sensor 6A.

When the leakage determination unit 7A determines that the refrigerant leakage occurs according to the detection result of the refrigerant leakage sensor 6A, the notification control unit 7B causes the notification unit 9 to output a notification, and the compressor control unit 7C stops the compressor 10. Further, the rotation speed control unit 7D activates the indoor fan 2 to thereby diffuse the refrigerant in the casing 1 throughout the air-conditioned space.

[Advantageous Effects of Indoor Unit 100 of Air-Conditioning Apparatus 200 According to Embodiment 1]

In the indoor unit 100 of the air-conditioning apparatus 200 according to Embodiment 1, the air inlet 1B is located on the lower side of the casing 1, and the air outlet 1A is located on the upper side of the casing 1. In addition, the refrigerant leakage sensor 6A is located below the indoor heat exchanger 3 in the casing 1.

Therefore, when the refrigerant leaks out while the indoor unit 100 is out of operation, the flammable refrigerant which is heavier than air moves downward from the leakage point, so that the refrigerant leakage sensor 6A detects the refrigerant leakage. In contrast, when the refrigerant leaks out while the indoor unit 100 is in operation, the refrigerant is discharged through the air outlet 1A and diffused in the air-conditioned space together with air, by operation of the indoor fan 2. Even when the refrigerant concentration increases in the air-conditioned space, the presence of the refrigerant can be detected by the refrigerant leakage sensor because the air in the air-conditioned space is introduced through the air inlet. Thus, the indoor unit 100 of the air-conditioning apparatus 200 according to Embodiment 1 is capable of detecting the refrigerant leakage irrespective of whether or not the indoor fan 2 is in operation. In other words, the indoor unit 100 of the air-conditioning apparatus 200 according to Embodiment 1 is capable of more reliably detecting the refrigerant leakage, both when the indoor fan 2 is in operation and when the indoor fan 2 is out of operation.

Although the indoor unit 100 of the air-conditioning apparatus 200 according to Embodiment 1 is exemplified by a floor-mounted indoor unit, the indoor unit 100 may be of a different type. The same advantageous effects as those provided by the indoor unit 100 of the air-conditioning apparatus 200 according to Embodiment 1 can be obtained, for example, from a wall-mounted indoor unit.

[Variation 1 of Embodiment 1]

Figure 6:
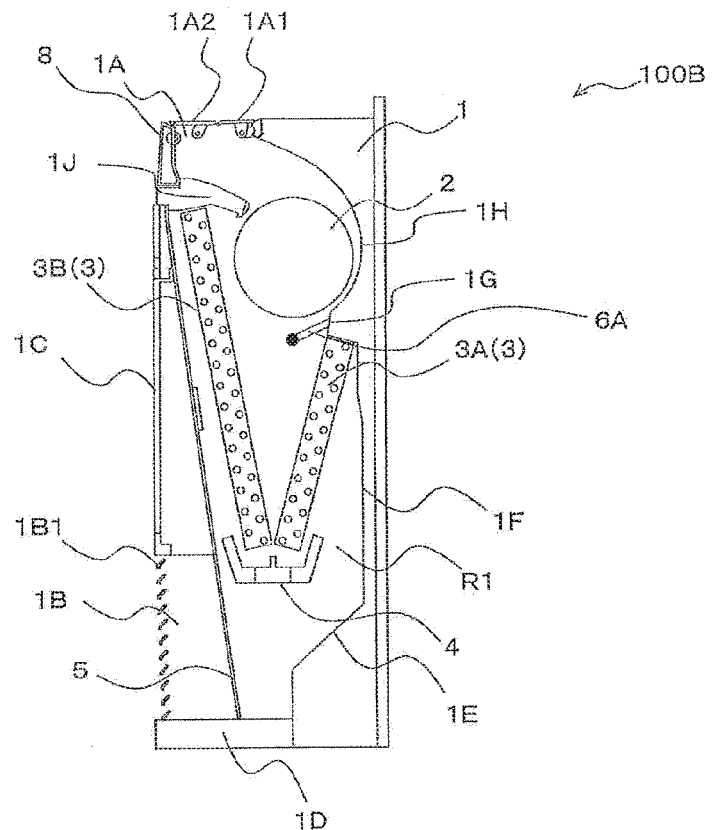
FIG. 6 is a side cross-sectional view for illustrating an external structure and internal structure of an indoor unit 100B according to Variation 1 of Embodiment 1 of the present invention.
Figure 7:
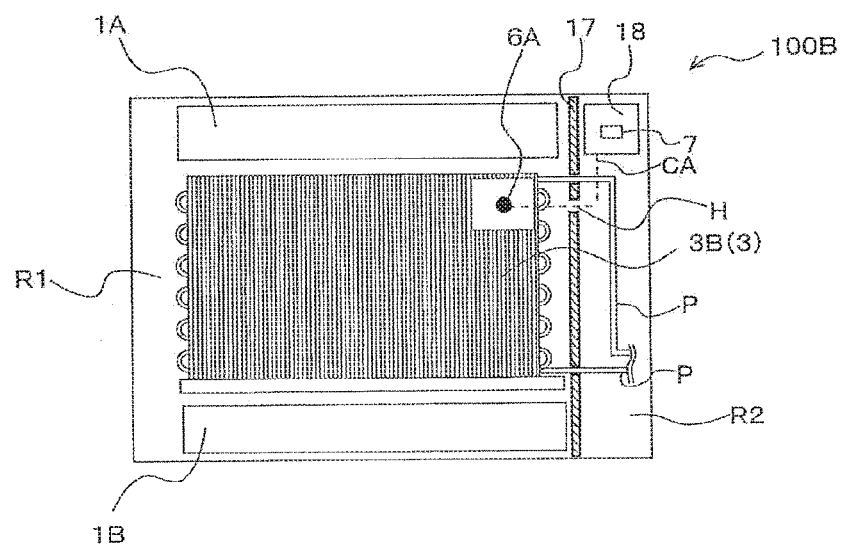
FIG. 7 is a schematic diagram for illustrating a mounting position of the refrigerant leakage sensor 6A in the indoor unit 100B according to Variation 1 of Embodiment 1 of the present invention.

FIG. 6 is a side cross-sectional view for illustrating an external structure and internal structure of an indoor unit 100B according to Variation 1 of Embodiment 1. FIG. 7 is a schematic diagram for illustrating a mounting position of the refrigerant leakage sensor 6A in the indoor unit 100B according to Variation 1 of Embodiment 1. Referring to FIG. 6 and FIG. 7, Variation 1 of Embodiment 1 will be described hereunder focusing on a difference from Embodiment 1.

A difference between the indoor unit 100 according to Embodiment 1 and the indoor unit 100B according to Variation 1 lies in the mounting position of the refrigerant leakage sensor 6A. In Variation 1, the refrigerant leakage sensor 6A is disposed on the way of the air passage R1, like the refrigerant leakage sensor 6A in the indoor unit 100 according to Embodiment 1. In Variation 1, however, the refrigerant leakage sensor 6A is mounted on the support portion 1G, so as to be positioned downstream of the indoor heat exchanger 3 in the airflow direction and upstream of the indoor fan 2 in the airflow direction. With the refrigerant leakage sensor 6A thus positioned, the refrigerant which has migrated to the region downstream of the indoor heat exchanger 3 can be detected, when the refrigerant leaks out in the casing 1.

When the refrigerant leaks out from the indoor heat exchanger 3 while the indoor unit 100 (indoor fan 2) is in operation, the refrigerant is caused to flow upward by operation of the indoor fan 2, so that the refrigerant leakage sensor 6A can detect the refrigerant leakage.

When the leakage determination unit 7A determines that the refrigerant leakage occurs according to the detection result of the refrigerant leakage sensor 6A, the notification control unit 7B causes the notification unit 9 to output a notification, and the compressor control unit 7C stops the compressor 10. In addition, when the refrigerant leakage is detected while the indoor unit 100 is in operation, the rotation speed of the indoor fan 2 is increased, to diffuse the refrigerant in the casing 1 throughout the air-conditioned space.

Although the foregoing description refers to the case where the indoor unit 100 (indoor fan 2) is in operation, the indoor unit 100B can equally detect the refrigerant leakage, even when the indoor unit 100 (indoor fan 2) is out of operation.

Generally the refrigerant tends to reside in the lower region inside the casing of the indoor unit 100B, since the specific gravity of the refrigerant is heavier than air. However, the refrigerant which has leaked out may migrate to the upper region inside the casing of the indoor unit 100B, for example when the refrigerant spouts out of the indoor heat exchanger 3. In such a case, the refrigerant leakage sensor 6A in the indoor unit 100B according to Variation 1 can detect the presence of the refrigerant, despite the indoor unit 100 being out of operation.

When the leakage amount of the refrigerant increases, the refrigerant may be accumulated in the casing of the indoor unit 100B, until reaching the level corresponding to the refrigerant leakage sensor 6A mounted on the support portion 1G. In this case also, the refrigerant leakage sensor 6A can detect the presence of the refrigerant, despite the indoor unit 100 being out of operation.

Thus, the indoor unit 100B according to Variation 1 of Embodiment 1 provides the same advantageous effects as those provided by the indoor unit 100 of the air-conditioning apparatus 200 according to Embodiment 1.

[Variation 2 of Embodiment 1]

Figure 8:
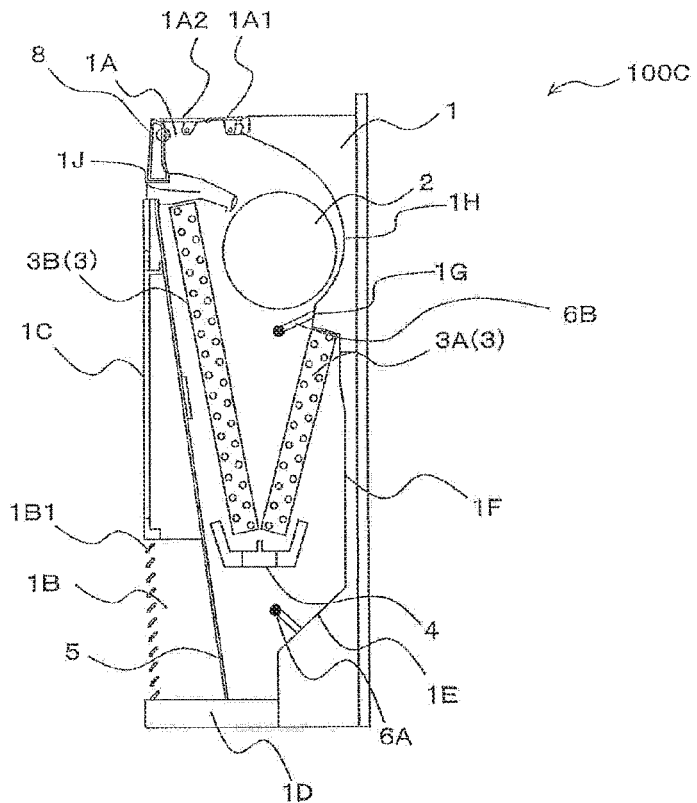
FIG. 8 is a side cross-sectional view for illustrating an external structure and internal structure of an indoor unit 100C according to Variation 2 of Embodiment 1 of the present invention.
Figure 9:
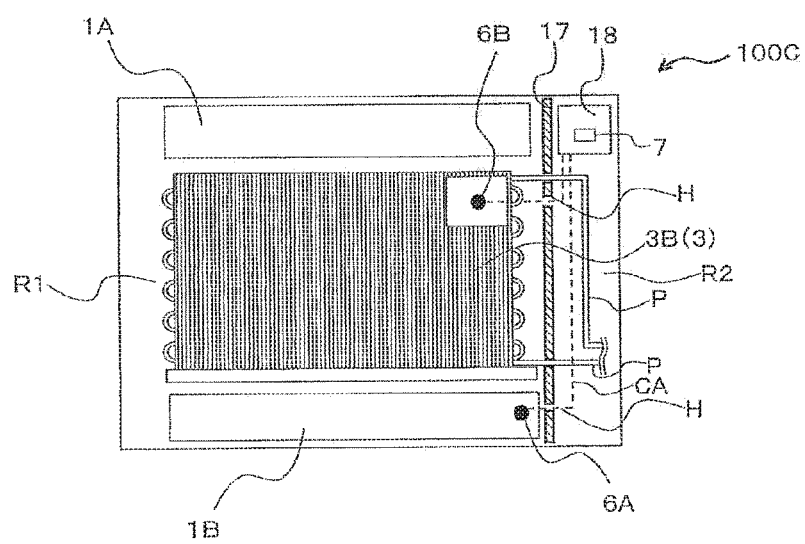
FIG. 9 is a schematic diagram for illustrating a mounting position of the refrigerant leakage sensor 6A in the indoor unit 100C according to Variation 2 of Embodiment 1 of the present invention.

FIG. 8 is a side cross-sectional view for illustrating an external structure and internal structure of an indoor unit 100C according to Variation 2 of Embodiment 1. FIG. 9 is a schematic diagram for illustrating a mounting position of the refrigerant leakage sensor 6A in the indoor unit 100C according to Variation 2 of Embodiment 1. Referring to FIG. 8 and FIG. 9, Variation 2 of Embodiment 1 will be described hereunder focusing on a difference from Embodiment 1.

In Variation 2 of Embodiment 1, the indoor unit 100 according to Embodiment 1 and the indoor unit 100B according to Variation 1 are combined. More specifically, the indoor unit 100C includes the refrigerant leakage sensor 6A mounted at the same position as the refrigerant leakage sensor 6A in the indoor unit 100 according to Embodiment 1, and a refrigerant leakage sensor 6B mounted at the same position as the refrigerant leakage sensor 6A in the indoor unit 100B according to Variation 1.

The indoor unit 100C according to Variation 2 of Embodiment 1 provides the following advantageous effect, in addition to those provided by the indoor unit 100 of the air-conditioning apparatus 200 according to Embodiment 1. Since the indoor unit 100C includes the pair of refrigerant leakage sensors, even when one of the refrigerant leakage sensors is disabled by a malfunction or the like, the refrigerant leakage can still be detected by the other refrigerant leakage sensor, and therefore firing of the refrigerant can be more reliably prevented.

Embodiment 2

Figure 10:
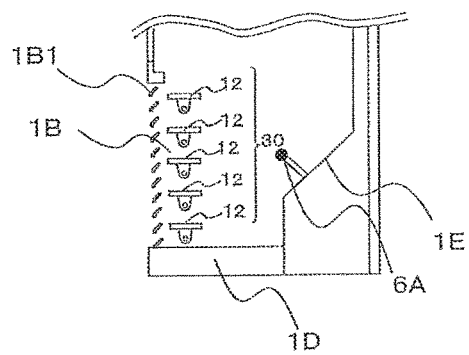
FIG. 10 is a side cross-sectional view for explaining an air inlet 1B and surroundings in the indoor unit of the air-conditioning apparatus 200 according to Embodiment 2 of the present invention, the air inlet 1B being open.
Figure 11:
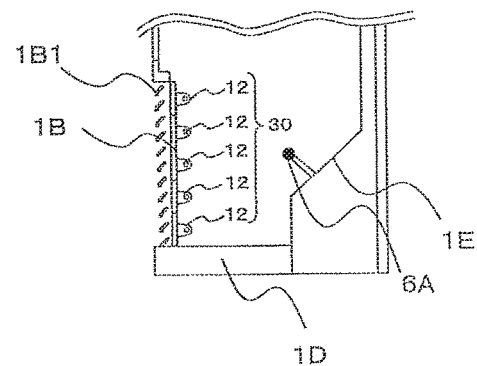
FIG. 11 is a side cross-sectional view for explaining the air inlet 1B and surroundings in the indoor unit of the air-conditioning apparatus 200 according to Embodiment 2 of the present invention, the air inlet 1B being closed.
Figure 12:
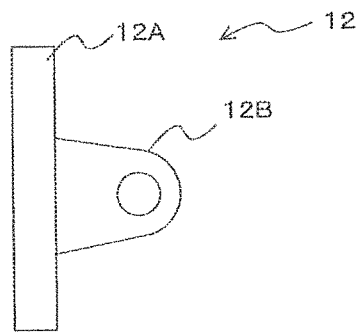
FIG. 12 is an enlarged side view of a pivotal element 12 of an air inlet opening and closing unit 30 shown in FIG. 10 and FIG. 11.
Figure 13:
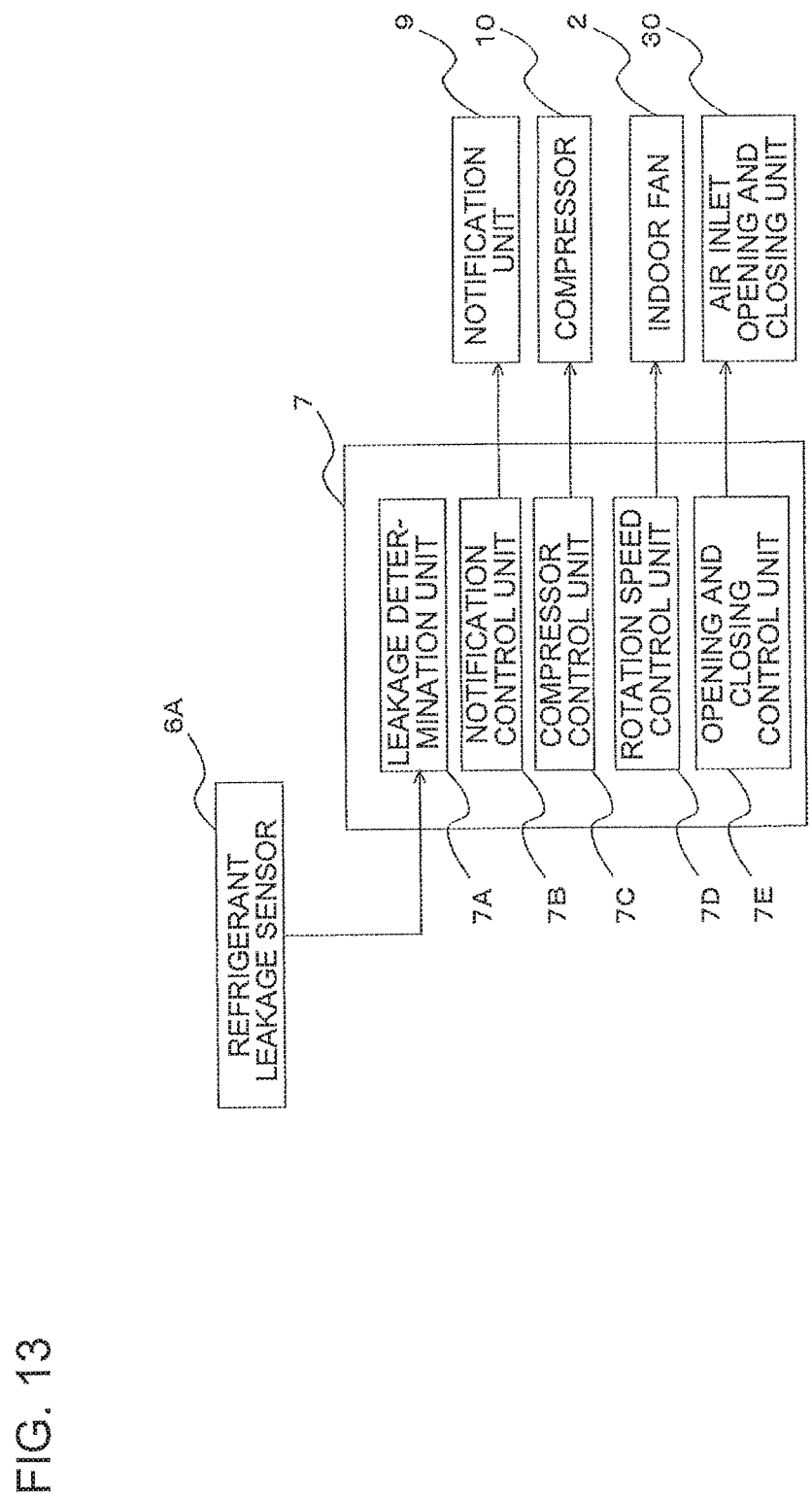
FIG. 13 is a block diagram for explaining a configuration of the controller 7 and associated components in the indoor unit of the air-conditioning apparatus 200 according to Embodiment 2 of the present invention.

FIG. 10 is a side cross-sectional view for explaining the air inlet 1B and surroundings in the indoor unit of the air-conditioning apparatus 200 according to Embodiment 2, the air inlet 1B being open. FIG. 11 is a side cross-sectional view for explaining the air inlet 1B and surroundings in the indoor unit of the air-conditioning apparatus 200 according to Embodiment 2, the air inlet 1B being closed. FIG. 12 is an enlarged side view of a pivotal element 12 of an air inlet opening and closing unit 30 shown in FIG. 10 and FIG. 11. FIG. 13 is a block diagram for explaining a configuration of the controller 7 and associated components in the indoor unit of the air-conditioning apparatus 200 according to Embodiment 2.

Embodiment 2 will be described hereunder with reference to FIG. 10 to FIG. 13. In Embodiment 2, the same elements as those of Embodiment 1 will be given the same numerals, and the description of Embodiment 2 will be focused on a difference from Embodiment 1.

When the refrigerant leaks out while the indoor unit is out of operation, the refrigerant diffuses in the air-conditioned space through the air inlet 1B. Accordingly, the refrigerant concentration is less likely to increase around the refrigerant leakage sensor 6A, which may lead to degraded detection accuracy of the refrigerant leakage. In Embodiment 2, therefore, an air inlet opening and closing unit 30 is pivotably disposed on the air inlet 1B, in addition to the configuration of the indoor unit according to Embodiment 1. In addition, the controller 7 includes an opening and closing control unit 7E that rotates the air inlet opening and closing unit 30.

The air inlet opening and closing unit 30 is pivotably disposed on the air inlet 1B. The air inlet opening and closing unit 30 includes a plurality of pivotal elements 12. The plurality of pivotal elements 12 are aligned in the up and down direction inside the casing 1. The pivotal elements 12 are located on the inner side of the grille 1B1.

The pivotal elements 12 each include a flat plate-shaped portion 12A and a rotatable shaft portion 12B connected to the plate-shaped portion 12A. The plate-shaped portion 12A is oriented parallel to a vertical direction when closing the air inlet 1B, and parallel to a horizontal direction when opening the air inlet 1B. Here, although the plate-shaped portion 12A is assumed to be oriented parallel to the vertical and horizontal directions, the plate-shaped portion 12A may be deviated from the vertical or horizontal direction.

When the indoor unit is in operation, the opening and closing control unit 7E causes the shaft portion 12B of the pivotal element 12 to rotate so as to set the plate-shaped portion 12A parallel to the horizontal direction, thereby opening the air inlet opening and closing unit 30 as shown in FIG. 10.

In contrast, when the indoor unit is out of operation, the opening and closing control unit 7E causes the shaft portion 12B of the pivotal element 12 to rotate so as to set the plate-shaped portion 12A parallel to the vertical direction as shown in FIG. 11. Accordingly, in case that the refrigerant leaks out while the indoor unit is out of operation, the air inlet opening and closing unit 30 serves to facilitate the refrigerant concentration inside the casing 1 to increase, thereby facilitating the refrigerant leakage sensor 6A to more surely detect the refrigerant leakage.

When the refrigerant leakage is detected while the indoor unit is out of operation, the rotation speed control unit 7D activates the indoor fan 2. The rotation speed of the indoor fan 2 may be set, for example, to a maximum rotation speed. In addition, the opening and closing control unit 7E controls the air inlet opening and closing unit 30 so as to open the air inlet 1B. With such operation, the refrigerant in the casing 1 can be diffused in the air-conditioned space, and therefore the increase in refrigerant concentration inside the casing 1 can be suppressed. Consequently, a break out of fire due to a spark originating from short circuit of an electric part, which may occur owing to an increase in refrigerant concentration inside the casing 1, can be prevented.

[Advantageous Effects of Indoor Unit of Air-Conditioning Apparatus 200 According to Embodiment 2]

The indoor unit of the air-conditioning apparatus 200 according to Embodiment 2 provides the following advantageous effect, in addition to those provided by the indoor unit 100 of the air-conditioning apparatus 200 according to Embodiment 1.

The indoor unit of the air-conditioning apparatus 200 according to Embodiment 2 causes the air inlet opening and closing unit 30 to close the air inlet 1B when the indoor unit is out of operation, and therefore, in particular the detection accuracy of the refrigerant leakage sensor 6A with respect to refrigerant leakage can be improved. In addition, once the refrigerant leakage has been detected the air inlet opening and closing unit 30 is opened and the indoor fan 2 is activated. Accordingly, an increase in refrigerant concentration inside the casing 1 is suppressed, thereby avoiding a situation in which a fire may break out.

Embodiment 3

Figure 14:
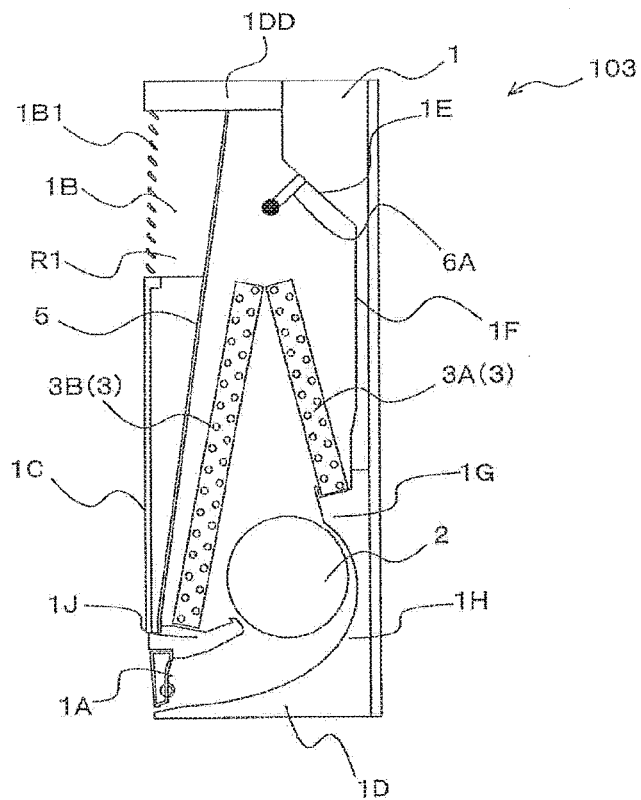
FIG. 14 is a side cross-sectional view for illustrating an external structure and internal structure of an indoor unit 103 of the air-conditioning apparatus 200 according to Embodiment 3 of the present invention.
Figure 15:
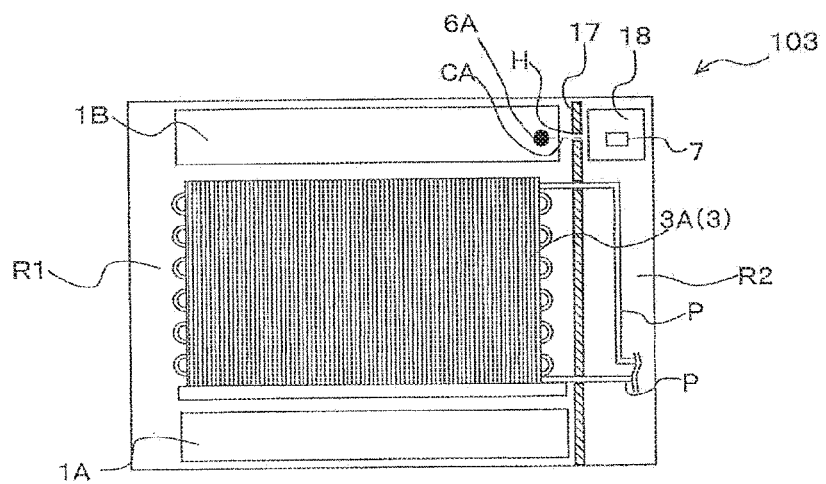
FIG. 15 is a schematic diagram for illustrating a mounting position of the refrigerant leakage sensor 6A in the indoor unit 103 of the air-conditioning apparatus 200 according to Embodiment 3 of the present invention.

FIG. 14 is a side cross-sectional view for illustrating an external structure and internal structure of an indoor unit 103 of the air-conditioning apparatus 200 according to Embodiment 3. FIG. 15 is a schematic diagram for illustrating a mounting position of the refrigerant leakage sensor 6A in the indoor unit 103 of the air-conditioning apparatus 200 according to Embodiment 3. Referring to FIG. 14 and FIG. 15, Embodiment 3 will be described hereunder. In Embodiment 3, the same elements as those of Embodiments 1 and 2 will be given the same numerals, and the description of Embodiment 3 will be focused on a difference from Embodiments 1 and 2.

In the indoor unit 103, the air inlet 1B is located on the upper side of the casing 1, and the air outlet 1A is located on the lower side of the casing 1, unlike in Embodiments 1 and 2. In other words, the positional relationship between the air inlet 1B and the air outlet 1A is reversed in Embodiment 3, with respect to Embodiments 1 and 2.

The indoor unit 103 includes the casing 1 constituting the outer shell, the indoor fan 2 located in a lower region in the casing 1, the indoor heat exchanger 3 including the first heat exchanger 3A and the second heat exchanger 3B, and the filter 5 that captures dust or the like. In addition, the indoor unit 103 includes the refrigerant leakage sensor 6A for detecting the refrigerant leaking out in the casing 1.

The casing 1 includes a top face 1DD against which the upper end portion of the filter 5 is abutted, the sloped portion 1E including a sloped surface inclined downward from the front side toward the rear side, the support portion 1G and the support portion 1J each supporting a lower end portion of the indoor heat exchanger 3.

The indoor fan 2 is located downstream of the indoor heat exchanger 3 in the airflow direction, for example at a position below the indoor heat exchanger 3.

The indoor heat exchanger 3 is installed in the casing 1 such that the respective upper end portions of the first heat exchanger 3A and the second heat exchanger 3B are located close to each other and the respective lower end portions of the first heat exchanger 3A and the second heat exchanger 3B are spaced from each other.

The filter 5 is obliquely installed such that the upper end portion recedes backward from the front side of the casing 1.

Further, the refrigerant leakage sensor 6A is located inside the casing 1 at a position above the uppermost portion of the indoor heat exchanger 3. In other words, the refrigerant leakage sensor 6A is located upstream of the indoor heat exchanger 3 in the airflow direction.

[Advantageous Effects of Indoor Unit 103 of Air-Conditioning Apparatus 200 According to Embodiment 3]

The indoor unit 103 of the air-conditioning apparatus 200 according to Embodiment 3 provides the same advantageous effects as those provided by the indoor unit 100 of the air-conditioning apparatus 200 according to Embodiment 1.

Here, the configuration of, for example, the air inlet opening and closing unit 30 described in Embodiment 2 may also be incorporated in the air inlet 1B in the indoor unit 103 of the air-conditioning apparatus 200 according to Embodiment 3.

[Variation 1 of Embodiment 3]

Figure 16:
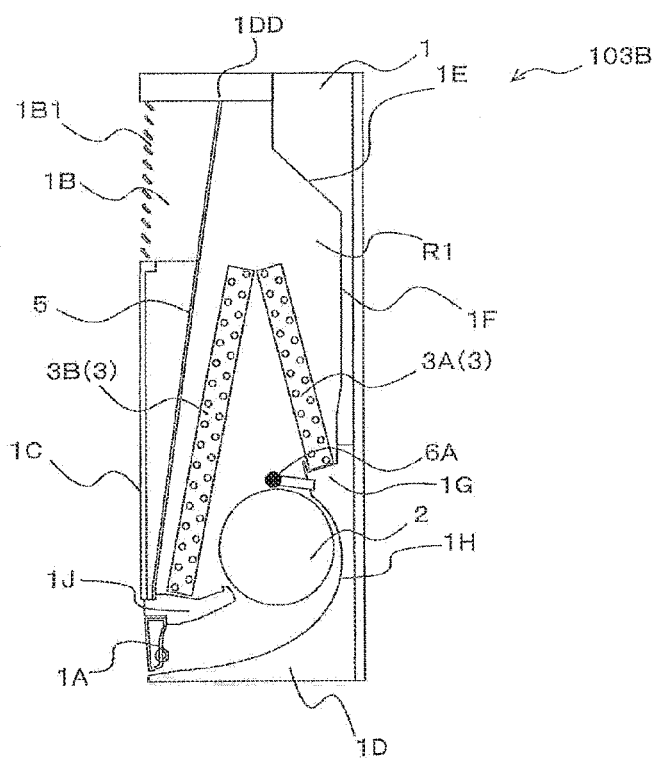
FIG. 16 is a side cross-sectional view for illustrating an external structure and internal structure of an indoor unit 103B according to Variation 1 of Embodiment 3 of the present invention.
Figure 17:
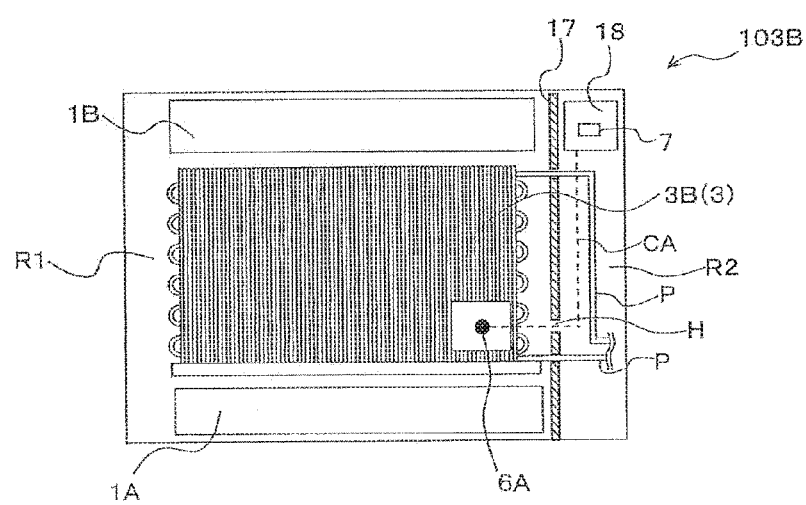
FIG. 17 is a schematic diagram for illustrating a mounting position of the refrigerant leakage sensor 6A in the indoor unit 103B according to Variation 1 of Embodiment 3 of the present invention.

FIG. 16 is a side cross-sectional view for illustrating an external structure and internal structure of an indoor unit 103B according to Variation 1 of Embodiment 3. FIG. 17 is a schematic diagram for illustrating a mounting position of the refrigerant leakage sensor 6A in the indoor unit 103B according to Variation 1 of Embodiment 3. Referring to FIG. 16 and FIG. 17, Variation 1 of Embodiment 3 will be described hereunder focusing on a difference from Embodiment 3.

Variation 1 of Embodiment 3 corresponds to Variation 1 of Embodiment 1. In other words, in Variation 1 of Embodiment 3 the refrigerant leakage sensor 6A is located at a position lower than the air inlet 1B, and below the position (summit) where the first heat exchanger 3A and the second heat exchanger 3B are brought close to each other. In addition, the refrigerant leakage sensor 6A is located right above the indoor fan 2. Further, the refrigerant leakage sensor 6A is mounted on the support portion 1G so as to be located downstream of the indoor heat exchanger 3 in the airflow direction and upstream of the indoor fan 2 in the airflow direction. The indoor unit 103B according to Variation 1 of Embodiment 3 provides the same advantageous effects as those provided by Variation 1 of Embodiment 1.

[Variation 2 of Embodiment 3]

Figure 18:
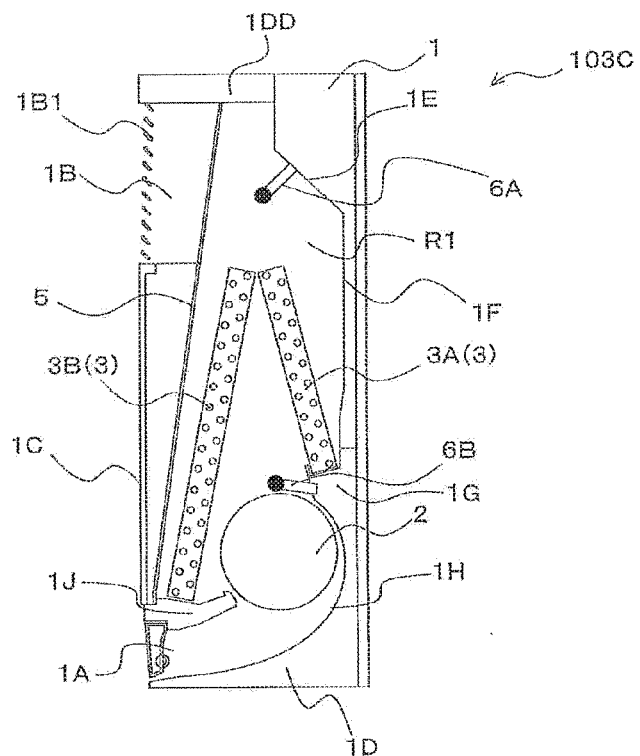
FIG. 18 is a side cross-sectional view for illustrating an external structure and internal structure of an indoor unit 103C according to Variation 2 of Embodiment 3 of the present invention.
Figure 19:
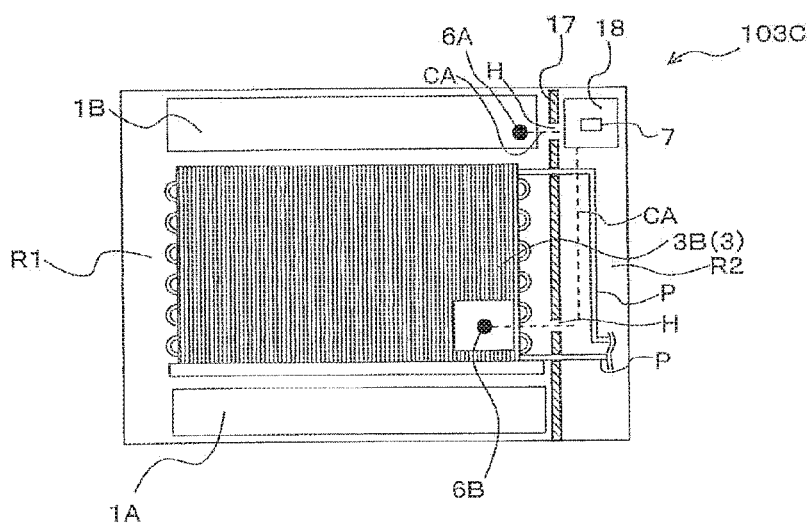
FIG. 19 is a schematic diagram for illustrating a mounting position of the refrigerant leakage sensor 6A in the indoor unit 103C according to Variation 2 of Embodiment 3 of the present invention.

FIG. 18 is a side cross-sectional view for illustrating an external structure and internal structure of an indoor unit 103C according to Variation 2 of Embodiment 3. FIG. 19 is a schematic diagram for illustrating a mounting position of the refrigerant leakage sensor 6A in the indoor unit 103C according to Variation 2 of Embodiment 3. Referring to FIG. 18 and FIG. 19, Variation 2 of Embodiment 3 will be described hereunder focusing on a difference from Embodiment 3.

Variation 2 of Embodiment 3 corresponds to Variation 2 of Embodiment 1. In other words, in Variation 2 of Embodiment 3 the indoor unit 103 according to Embodiment 3 and the indoor unit 103B according to Variation 1 are combined. More specifically, the indoor unit 103C includes the refrigerant leakage sensor 6A mounted at the same position as the refrigerant leakage sensor 6A in the indoor unit 103 according to Embodiment 3, and the refrigerant leakage sensor 6B mounted at the same position as the refrigerant leakage sensor 6A in the indoor unit 103B according to Variation 1. With the mentioned configuration, the same advantageous effects as those provided by Variation 2 of Embodiment 1 can be obtained.

Embodiment 4

Figure 20:
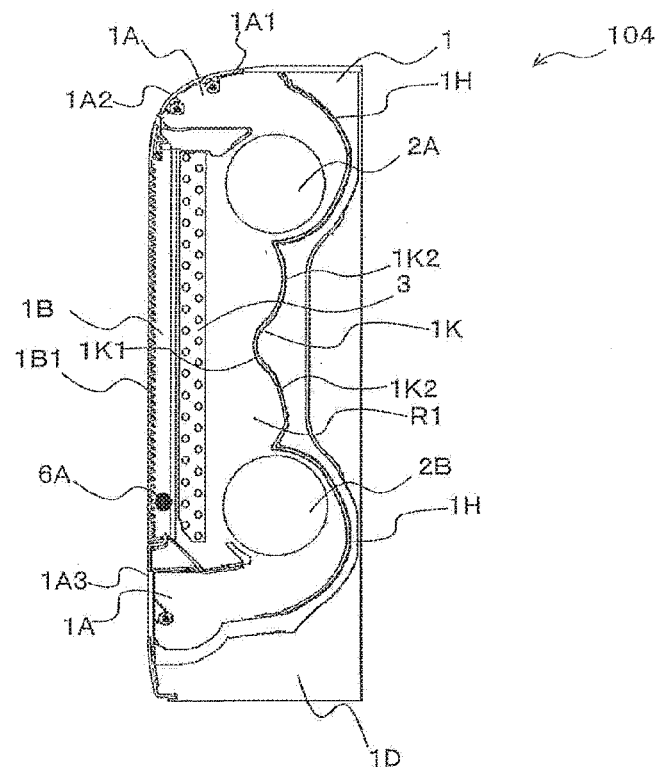
FIG. 20 is a side cross-sectional view for illustrating an external structure and internal structure of an indoor unit 104 of the air-conditioning apparatus 200 according to Embodiment 4 of the present invention.
Figure 21:
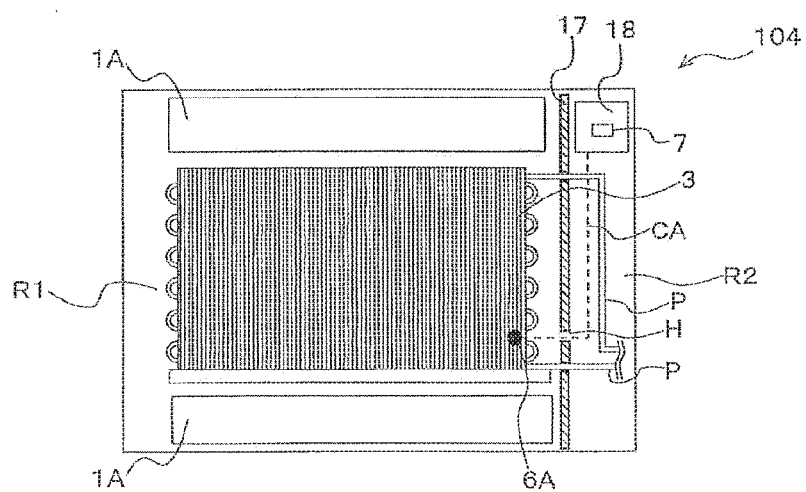
FIG. 21 is a schematic diagram for illustrating a mounting position of the refrigerant leakage sensor 6A in the indoor unit 104 of the air-conditioning apparatus 200 according to Embodiment 4 of the present invention.

FIG. 20 is a side cross-sectional view for illustrating an external structure and internal structure of an indoor unit 104 of the air-conditioning apparatus 200 according to Embodiment 4. FIG. 21 is a schematic diagram for illustrating a mounting position of the refrigerant leakage sensor 6A in the indoor unit 104 of the air-conditioning apparatus 200 according to Embodiment 4. Referring to FIG. 20 and FIG. 21, Embodiment 4 will be described hereunder. In Embodiment 4, the same elements as those of Embodiments 1 to 3 will be given the same numerals, and the description of Embodiment 4 will be focused on a difference from Embodiments 1 to 3.

In the indoor unit 104, the air inlet 1B is formed in a central portion of the front face of the casing 1, unlike in Embodiments 1 to 3. In addition, one air outlet 1A is provided at each of the upper and lower portions of the casing 1.

The indoor unit 104 includes the casing 1 including the air inlet 1B and the pair of air outlets 1A arranged such that the air inlet 1B is located between one of the air outlets 1A and the other air outlet 1A, the indoor heat exchanger 3 disposed inside the casing 1 so as to oppose the grille 1B1 provided in the air inlet 1B, an indoor fan 2A disposed inside the casing 1 to discharge air through the upper air outlet 1A and an indoor fan 2B disposed inside the casing 1 to discharge air through the lower air outlet 1A, the refrigerant leakage sensor 6A located between the air inlet 1B and the indoor heat exchanger 3 to detect refrigerant leakage, and the controller 7 that determines whether the refrigerant leakage occurs according to the detection result of the refrigerant leakage sensor 6A.

The casing 1 includes the air inlet 1B formed in the central portion of the front face. The grille 1B1 of the air inlet 1B is opposed to the indoor heat exchanger 3. In Embodiment 4, the air inlet 1B is larger than that of the indoor units according to Embodiments 1 to 3. In Embodiment 4, the area of the air inlet 1B is, for example, approximately equal to the area of the indoor heat exchanger 3 viewed from the front side. However, the air inlet 1B may be formed in a different size.

The casing 1 includes the pair of air outlets 1A respectively located in the upper and lower portions. The upper air outlet 1A is provided with a louver 1A1 and a louver 1A2 which are pivotable. The lower air outlet 1A is provided with a pivotable louver 1A3. The louver 1A1, the louver 1A2, and the louver 1A3 allow the direction of air blown out of the casing 1 to be adjusted, and allow the air outlet 1A to be closed, to thereby prevent intrusion of dust or the like into the air passage R1 in the casing 1.

The casing 1 includes a curved portion 1K. The curved portion 1K is located so as to oppose the rear face of the indoor heat exchanger 3. The curved portion 1K includes a convex portion 1K1 formed so as to protrude forward from the rear side. Accordingly, the curved portion 1K is capable of splitting the air which has passed through the indoor heat exchanger 3 into a flow directed to the indoor fan 2A and a flow directed to the indoor fan 2B, without incurring an increase in pressure loss. In addition, the curved portion 1K includes concave portions 1K2 respectively formed on the upper and lower sides of the convex portion 1K1. The concave portions 1K2 are each formed so as to recede backward from the front side. The upper concave portion 1K2 can smoothly guide the air toward the indoor fan 2A, because of having a curved surface. Likewise, the lower concave portion 1K2 can smoothly guide the air toward the indoor fan 2B, because of having a curved surface.

The indoor fan 2A is located downstream of the indoor heat exchanger 3 in the airflow direction, for example at a position opposing an upper portion of the rear face of the indoor heat exchanger 3. The indoor fan 2B is located downstream of the indoor heat exchanger 3 in the airflow direction, for example at a position opposing a lower portion of the rear face of the indoor heat exchanger 3.

The indoor heat exchanger 3 does not include a pair of heat exchangers, unlike in Embodiments 1 to 3. In other words, in Embodiment 4 the indoor heat exchanger 3 includes a single heat exchange unit. The indoor heat exchanger 3 is oriented in a vertical direction.

Further, the refrigerant leakage sensor 6A is located between the grille 1B1 of the air inlet 1B and the indoor heat exchanger 3, so as to oppose a lower portion of the front face of the indoor heat exchanger 3. The refrigerant leakage sensor 6A is located upstream of the indoor heat exchanger 3 in the airflow direction.

[Advantageous Effects of Indoor Unit 104 of Air-Conditioning Apparatus 200 According to Embodiment 4]

The indoor unit 104 of the air-conditioning apparatus 200 according to Embodiment 4 provides the same advantageous effects as those provided by the indoor units 100 and 103 of the air-conditioning apparatus 200 according to Embodiments 1 and 3.

Here, the configuration of, for example, the air inlet opening and closing unit 30 described in Embodiment 2 may also be incorporated in the air inlet 1B in the indoor unit 104 of the air-conditioning apparatus 200 according to Embodiment 4.

[Variation 1 of Embodiment 4]

Figure 22:
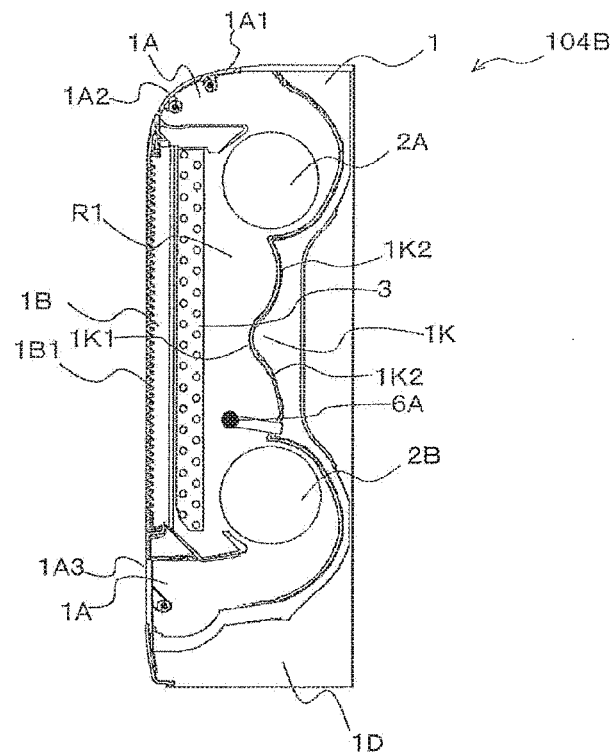
FIG. 22 is a side cross-sectional view for illustrating an external structure and internal structure of an indoor unit 104B according to Variation 1 of Embodiment 4 of the present invention.
Figure 23:
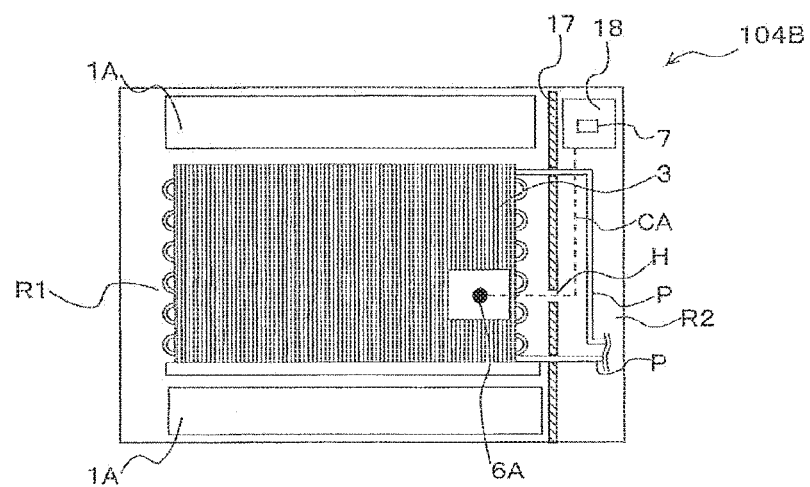
FIG. 23 is a schematic diagram for illustrating a mounting position of the refrigerant leakage sensor 6A in the indoor unit 104B according to Variation 1 of Embodiment 4 of the present invention.

FIG. 22 is a side cross-sectional view for illustrating an external structure and internal structure of an indoor unit 104B according to Variation 1 of Embodiment 4. FIG. 23 is a schematic diagram for illustrating a mounting position of the refrigerant leakage sensor 6A in the indoor unit 104B according to Variation 1 of Embodiment 4. Referring to FIG. 22 and FIG. 23, Variation 1 of Embodiment 4 will be described hereunder focusing on a difference from Embodiment 4.

Variation 1 of Embodiment 4 is different from Embodiment 4 in that the refrigerant leakage sensor 6A is mounted on the curved portion 1K. The refrigerant tends to reside in the lower region inside the casing 1 of the indoor unit 104B, since the specific gravity of the refrigerant is heavier than air. For such reason the refrigerant leakage sensor 6A is disposed at a lower end portion of the curved portion 1K. Such a configuration allows the refrigerant leakage to be more reliably detected. The refrigerant leakage sensor 6A is located on the rear side of the indoor heat exchanger 3. In other words, the refrigerant leakage sensor 6A is located downstream of the indoor heat exchanger 3 in the airflow direction. The indoor unit 104B according to Variation 1 of Embodiment 4 also provides the same advantageous effects as those provided by the indoor unit 104 of the air-conditioning apparatus 200 according to Embodiment 4.

[Variation 2 of Embodiment 4]

Figure 24:
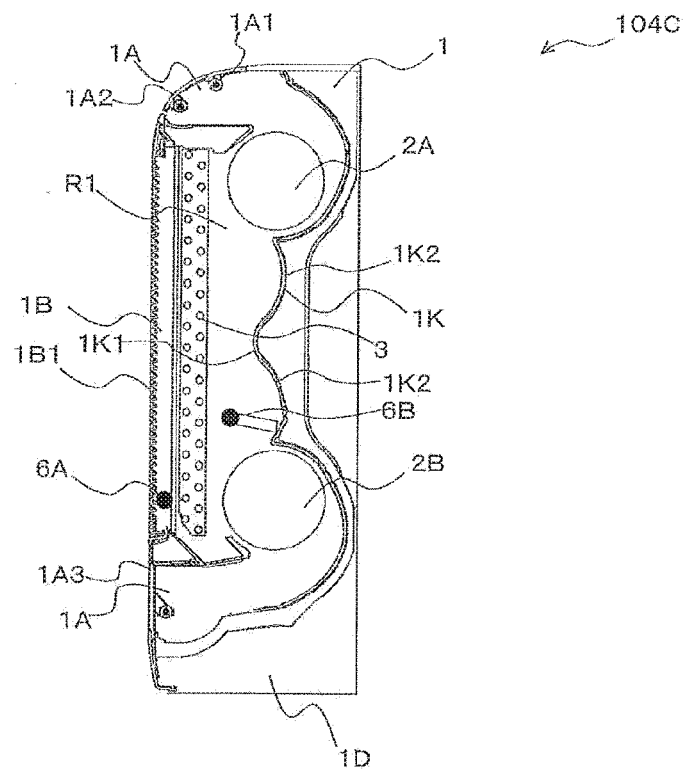
FIG. 24 is a side cross-sectional view for illustrating an external structure and internal structure of an indoor unit 104C according to Variation 2 of Embodiment 4 of the present invention.
Figure 25:
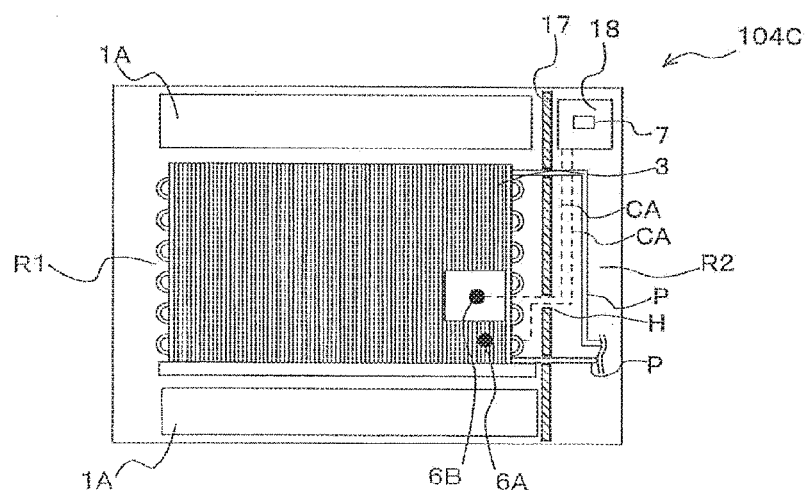
FIG. 25 is a schematic diagram for illustrating a mounting position of the refrigerant leakage sensor 6A in the indoor unit 104C according to Variation 2 of Embodiment 4 of the present invention.

FIG. 24 is a side cross-sectional view for illustrating an external structure and internal structure of an indoor unit 104C according to Variation 2 of Embodiment 4. FIG. 25 is a schematic diagram for illustrating a mounting position of the refrigerant leakage sensor 6A in the indoor unit 104C according to Variation 2 of Embodiment 4. Referring to FIG. 24 and FIG. 25, Variation 2 of Embodiment 4 will be described hereunder focusing on a difference from Embodiment 4.

In Variation 2 of Embodiment 4, the indoor unit 104 according to Embodiment 4 and the indoor unit 104B according to Variation 1 are combined. More specifically, the indoor unit 104C includes the refrigerant leakage sensor 6A mounted at the same position as the refrigerant leakage sensor 6A in the indoor unit 104 according to Embodiment 4, and the refrigerant leakage sensor 6B mounted at the same position as the refrigerant leakage sensor 6A in the indoor unit 104B according to Variation 1.

Since the indoor unit 104C according to Variation 2 of Embodiment 4 includes the pair of refrigerant leakage sensors, even when one of the refrigerant leakage sensors is disabled by a malfunction or the like, the refrigerant leakage can still be detected by the other refrigerant leakage sensor, and therefore firing of the refrigerant can be more reliably prevented.

The invention claimed is:

1. An indoor unit for an air-conditioning apparatus, comprising:
   a casing including an air inlet, an air outlet, and an air passage communicating between the air inlet and the air outlet, the air inlet being located lower than the air outlet;

an indoor heat exchanger disposed inside the casing;
a drain pan disposed under the indoor heat exchanger and inside the casing;
an indoor fan disposed at a downstream side of the indoor heat exchanger in an airflow direction and inside the casing, and configured to supply air to the indoor heat exchanger;
a first refrigerant leakage sensor disposed in the air passage between the air inlet and the air outlet at a position lower than the drain pan and the air outlet, and configured to detect refrigerant leakage; and
a controller configured to determine whether refrigerant leakage occurs, according to a detection result of the first refrigerant leakage sensor,
the indoor unit being a floor-mounted indoor unit.

2. The indoor unit for an air-conditioning apparatus of claim 1, further comprising
a second refrigerant leakage sensor disposed in the air passage between the air inlet and the air outlet at the downstream side of the indoor heat exchanger in the airflow direction, and configured to detect refrigerant leakage,
wherein the controller is configured to determine whether refrigerant leakage occurs, according to the detection result of the first refrigerant leakage sensor and a detection result of the second refrigerant leakage sensor.

3. The indoor unit for an air-conditioning apparatus of claim 1,
wherein, upon determining that refrigerant leakage occurs, the controller is configured to increase rotation speed of the indoor fan, when the indoor fan is in operation.

4. The indoor unit for an air-conditioning apparatus of claim 1,
wherein, upon determining that refrigerant leakage occurs, the controller is configured to activate the indoor fan when the indoor fan is out of operation.

5. The indoor unit for an air-conditioning apparatus of claim 4, further comprising
an air inlet opening and closing unit attached to the air inlet and configured to open and close the air inlet,
wherein the controller is configured to cause the air inlet opening and closing unit to close the air inlet when the indoor fan is out of operation.

6. The indoor unit for an air-conditioning apparatus of claim 5,
wherein, upon determining that refrigerant leakage occurs, the controller is configured to activate the indoor fan, and to cause the air inlet opening and closing unit to open the air inlet.

7. The indoor unit for an air-conditioning apparatus of claim 1, further comprising
a notification unit to be utilized to notify occurrence of refrigerant leakage,
wherein the controller is configured to cause the notification unit to output a notification, upon determining that refrigerant leakage occurs.

8. The indoor unit for an air-conditioning apparatus of claim 7,
wherein the notification unit includes a sound output unit disposed in the casing and configured to output an audible message notifying the occurrence of the refrigerant leakage.

9. An air-conditioning apparatus comprising a refrigerant circuit including the indoor unit of claim 1, and an outdoor unit connected to the indoor unit via a refrigerant pipe.

10. The air-conditioning apparatus of claim 9, wherein:
the outdoor unit includes a compressor configured to compress refrigerant, and
the controller of the indoor unit is configured to stop operation of the compressor, upon determining that refrigerant leakage occurs.

11. The air-conditioning apparatus of claim 9,
wherein the refrigerant circuit is charged with one of an HFO1234yf-based single refrigerant, a mixed refrigerant containing a tetrafluoropropene-based refrigerant, and a flammable refrigerant such as hydrocarbon-based refrigerant.

12. The indoor unit for an air-conditioning apparatus of claim 1, wherein:
the casing includes a sloped portion having a sloped surface inclined upward from a front side toward a rear side and forming a part of the air passage,
the sloped portion is located lower than the indoor heat exchanger, and
the first refrigerant leakage sensor is located on the sloped portion.

* * * * *